United States Patent [19]
Rouban

[11] 3,752,244
[45] Aug. 14, 1973

[54] WEIGHT-MEASURING UNIT
[75] Inventor: Basile Rouban, Clamart, France
[73] Assignee: Trayvou S. A., Val de Marne, France
[22] Filed: July 20, 1972
[21] Appl. No.: 273,643

[30] Foreign Application Priority Data
July 21, 1971 France.............................. 7126731

[52] U.S. Cl...................... 177/1, 177/123, 222/313
[51] Int. Cl............................................ G01g 13/02
[58] Field of Search........................ 177/122, 123, 1; 222/70, 71, 77, 313

[56] References Cited
UNITED STATES PATENTS
| | | | |
|---|---|---|---|
| 2,829,856 | 4/1958 | Gregory.............................. | 177/122 |
| 2,860,848 | 11/1958 | Weaver et al...................... | 177/122 |
| 2,860,849 | 11/1958 | Weaver et al...................... | 177/122 X |
| 2,763,457 | 9/1956 | Gregory.............................. | 177/122 X |
| 2,727,713 | 12/1955 | Kindseth et al.................... | 177/123 X |

*Primary Examiner*—George H. Miller, Jr.
*Attorney*—Watson, Cole, Grindle & Watson

[57] ABSTRACT

A two stage method of performing weighings of repeated dosages of granulated or powdered material in which the variations in "surplus" of the dosages are reduced by modulating, in dependence on the time taken by a "predosage" step, the rate of volume flow of the material to a weight sensing device during a second or "balance quantity" step, so as to obtain from one weighing operation to the next a substantially constant rate of flow of material by weight during the "balance quantity" step. A device for weighing repeated dosages is also described. This has a hopper adjacent the exit of which is mounted a rotatable metering drum for feeding material to a weight sensing device. A screen having an opening therein can be brought at the end of the "predosage" step into contact with the drum in order to reduce the rate of volume flow of material to the weight sensing device during the "balance quantity" step. A shutter can be adjusted relative to the screen to vary the size of the opening and is arranged to move with the screen. A cam is rotated from a start position at the beginning of each weighing operation and is stopped at the end of the "predosage" step. This cam controls the adjustment of the shutter relative to the screen and thus effects the desired modulation of the rate of flow of material by volume during the "balance quantity" step.

14 Claims, 7 Drawing Figures

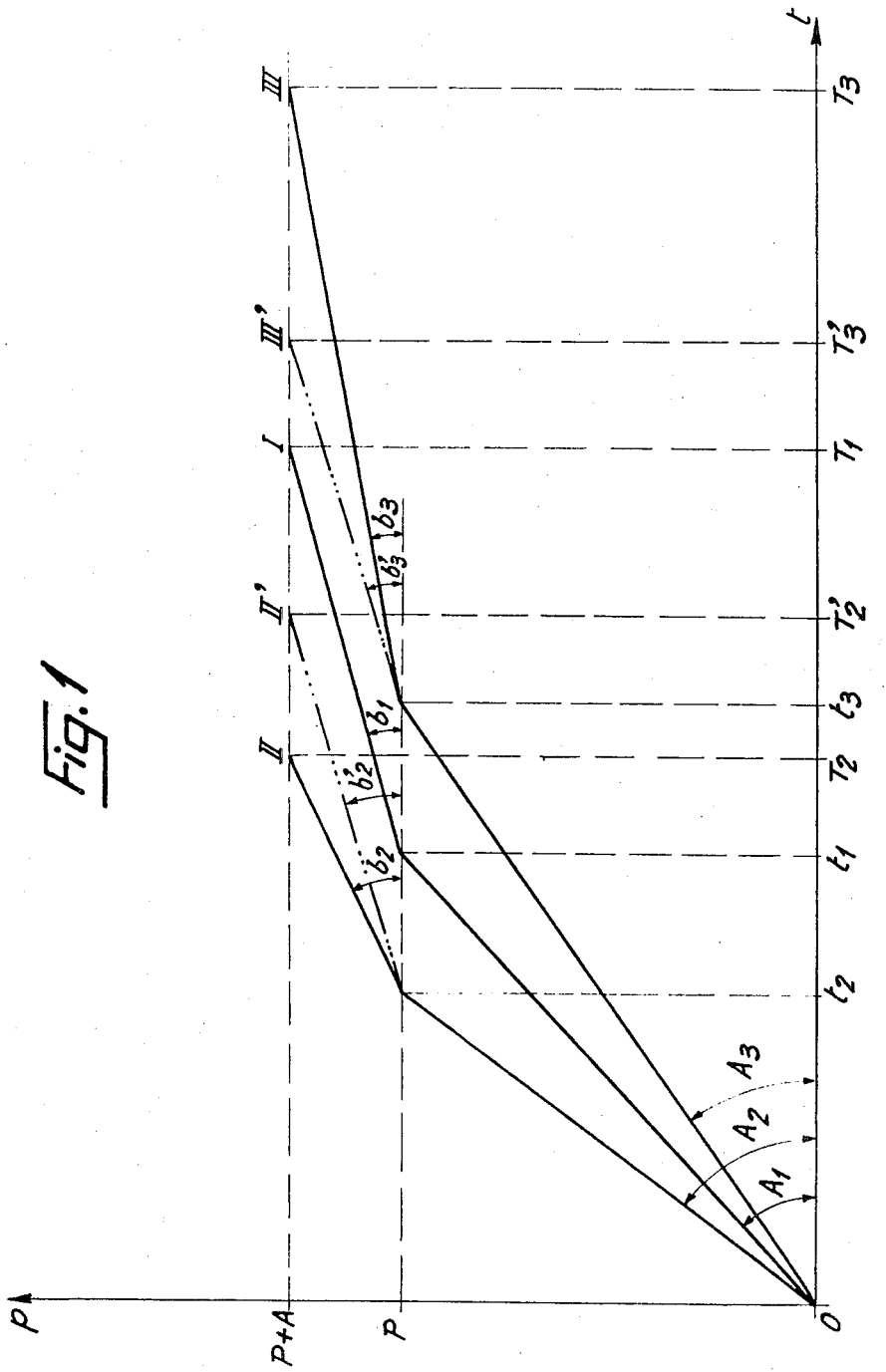

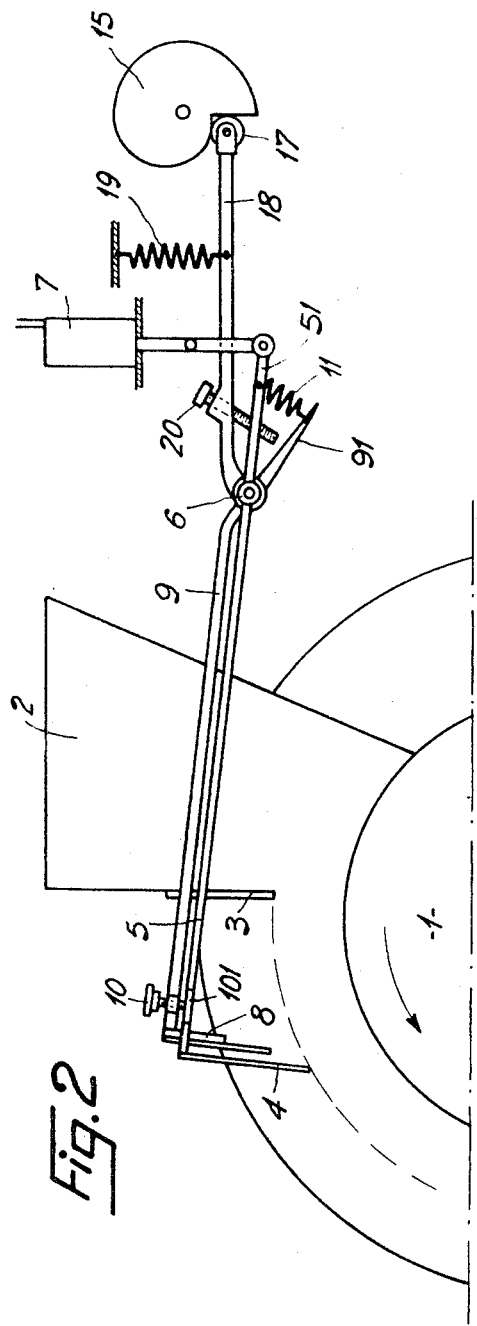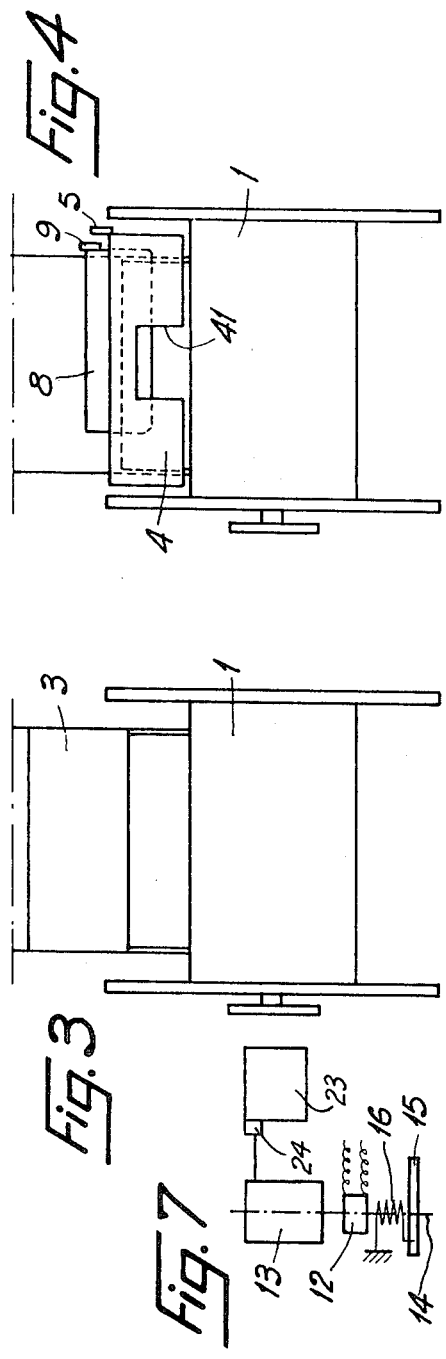

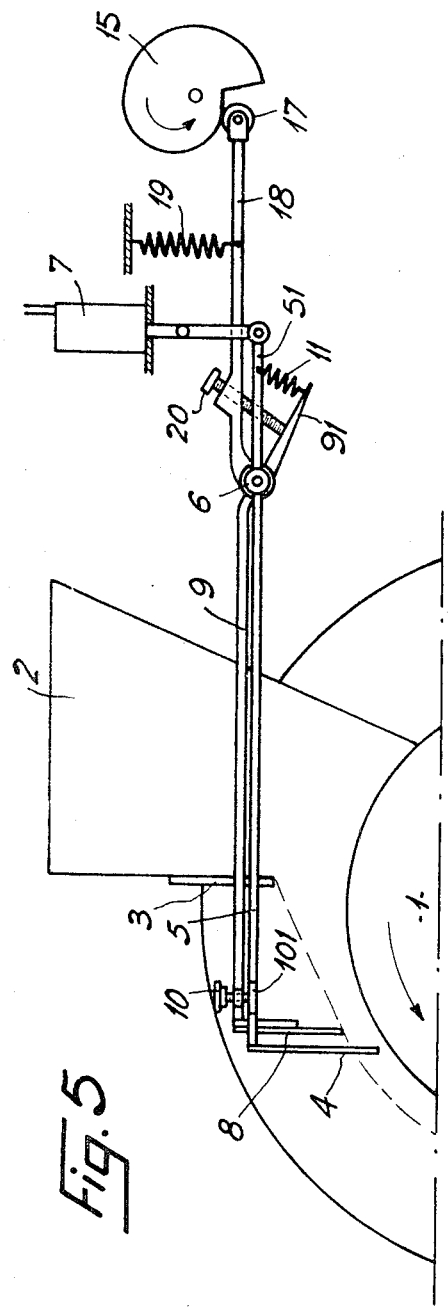
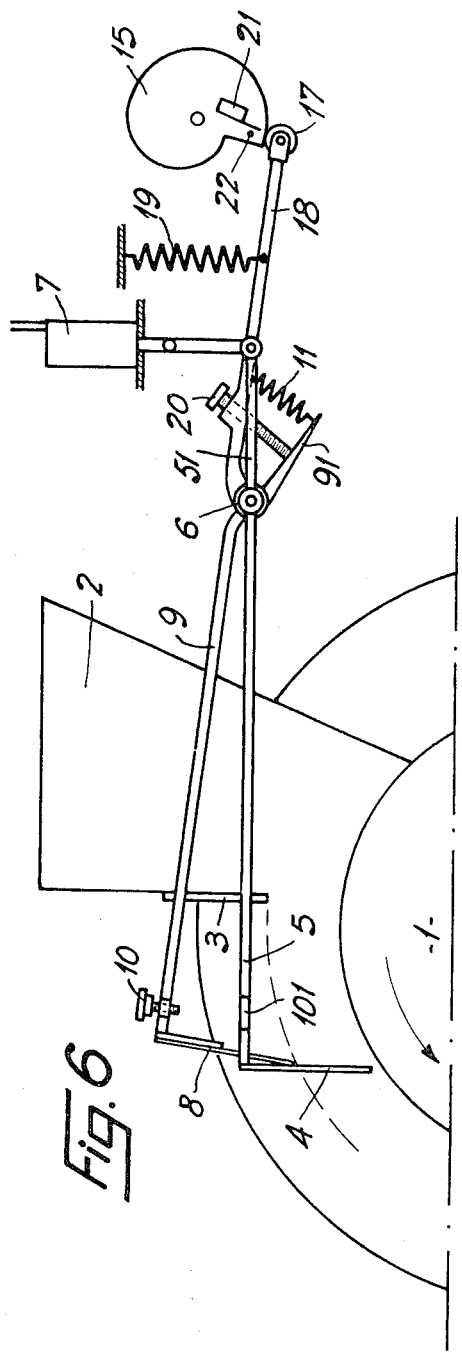

WEIGHT-MEASURING UNIT

This invention relates to unitary weight-measuring machines or units and more particularly to machines of this type which serve for establishing constant quantities of materials in powder or granulated form.

It is known that the variations in results obtained with such machines are largely due to the variation of the distribution surplus, that is to say, the quantity of product which is delivered without gravimetric control after the signal for stopping distribution of the product to be measured has been given by the weighing instrument.

This quantity of excess product, referred to as "surplus" of the weighing operation, is equal to the product of the rate of delivery on completing the weighing and a time determined by the influence of various factors, such as the inertia of the weighing instrument, the dropping height between the distributor and the receiver of the load and the stopping of the distributor, which factors are constant for a given apparatus. The same does not apply as regards the rate of delivery, which is particularly connected with the physical characteristics of the product to be weighed, which may be unstable.

As a general rule, for reducing the variation in weighed quantities, the distribution is carried out in two steps, a first step which is frequently called the "estimated" or "pre-dosage" step, during which the majority of the desired quantity is delivered to the load receiver, and a "balance quantity" step, during which the delivery of the desired quantity is completed, with a rate of delivery of product which is only a fraction of that used during the first step. Even if it is possible in this way to reduce the value of the "surplus," the fluctuations thereof are not eliminated.

The present invention seeks to develop a method and an equipment by which it is possible, for a given adjustment of the machine, to keep the surplus substantially constant, and thus to improve the accuracy of the results with a given functioning rate or to give, for an established variation, a higher functioning rate.

According to one aspect of the invention there is provided a method of regulating the operation of a weight-measuring unit which comprises delivering material to be weighed at a first constant rate of flow by volume in a predosage step until a predetermined major portion of the desired dosage has been delivered, and delivering the remaining minor portion of the desired dosage in a second step at a second rate of flow by volume which is less than the first constant rate, the second rate of flow by volume being modulated in proportion to the duration of the predosage step so as to maintain the rate of delivery by weight of the material during the second step at a value which is substantially constant from one weighing operation to the next.

According to another aspect of the invention there is provided a weight-measuring unit for measuring repeated dosages of powdered or granulated material comprising a weighing instrument, supply means for supplying material to the weighing instrument in a flowable stream, movable screen means movable from an inoperative position to an operative position in which said screen means cuts off partially said stream of flowable material, screen actuating means responsive to a signal from said weighing instrument when a predetermined major portion of a dosage has been delivered in a predosage step to said weighing instrument to move said screen means to said operative position, and modulating means for modulating, in dependence on the time taken to deliver said predetermined major portion to said weighing instrument, the degree of cut-off effected by said screen means in its operative position, whereby the rate of delivery by weight of the remaining minor portion of said dosage is maintained at a substantially constant rate from one weighing operation to another.

In order that the invention may be clearly understood and readily carried into effect, a preferred embodiment thereof will now be described, by way of example only, with reference to the accompanying drawings, wherein:

FIG. 1 shows a graph illustrating the rates of flow using a conventional unitary weight-measuring unit and a unitary weight-measuring unit according to the invention;

FIG. 2 is a diagramatic view in side elevation of an improved unitary weight-metering unit according to the invention, in the position for the "estimated" or "predosage" step;

FIG. 3 is a front elevation of the unit of FIG. 2 showing the control register for the "estimated" or "predosage" step;

FIG. 4 is a similar view to that of FIG. 3 in respect of the control register for the "balance quantity" step;

FIGS. 5 and 6 are views similar to FIG. 2, but representing the metering unit in the position for supplying the balance quantity, the correction of the flow section being in the maximum position in FIG. 5 and in the minimum position in FIG. 6; and FIG. 7 is a partial view which shows diagrammatically the control mechanism of the correction cam of the weight-measuring unit of FIG. 2.

Referring to the drawings FIG. 1 shows a graph, in which the time $t$ is plotted as the abscissa and the weight of poured product P is plotted as ordinate. This illustrates what happens in a conventional weighing arrangement in which the rate of flow during the "balance quantity" step is proportional to the rate of flow during the "estimated" or "predosage" step.

In the normal case, the rate of flow by weight of product during the estimation step is equal to $A_1$ and the rate of delivery by weight of the balance quantity is equal to $b_1$, these two values being connected by the equation:

$$A_1 = kb_1$$

The estimating step is terminated after the time $t_1$ and the measurement after the time $T_1$.

The curve I comprises a first straight segment starting from the original point with a slope equal to $A_1$ and ending when the "pre-measurement" P is reached, then a second straight segment of slope $b_1$, which stops when the desired measured quantity $P + A$ is obtained.

If it is assumed that, for example, with the volumetric rate of flow constant, the density of the product to be measured varies, which frequently happens with certain hygroscopic products such as detergents, powdered milks, and the like, it is possible to obtain "estimated" rates of deliveries by weight such as $A_2$ (which is larger than the normal rate $A_1$) or $A_3$ (which is smaller than $A_1$), so that the rate of delivery by weight of the balance quantity has values $b_2$ and $b_3$, such that:

$$A_2 + kb_2 \text{ and}$$

$$A_3 = kb_3$$

The estimation step is terminated after time periods $t_2$ and $t_3$, respectively, and the final weight after $T_2$ and $T_3$ (curves II and III). The weight distribution using a conventional machine may therefore vary within wide limits, since it is proportional to the rate of supply during the "balance quantity" step.

Now the variation of the surplus, which is proportional to the rate of supply during the "balance quantity" step and thus also to the rate of supply during the "estimated" or "predosage" step, is likewise proportional to the duration of the estimation step, since this is effected at a constant rate for each weighing operation.

Using the method of the invention, however, the volumetric rate of flow during the "balance quantity" step is modulated in proportion to the time which was required by the estimation step, so as to keep substantially constant the rate of delivery by weight of the balance quantity from one weighing operation to the other.

Thus, in the examples shown in FIG. 1, $b_2$ and $b_3$ will be respectively corrected to values $b'_2$ and $b'_3$ substantially equal to $b_1$, the corresponding distribution being represented by the segments II' and III' shown in broken lines.

As regards the curve II', since the rate of supply during the "balance quantity" step has been decreased compared with curve II, the total duration of the weighing operation has increased compared with curve II. However, in the case of curve III', this total duration has been decreased compared with curve III. In both cases, the total duration of the weighing operation is brought closer to the normal duration, i.e., closer to time $T_1$ of curve I, and this is an advantage.

In the device of FIG. 2, the metering unit comprises an extractor roller 1 associated with a hopper 2, of which the orifice has a section which can be regulated by means of a register 3. The extractor roller is arranged to turn in a counter-clockwise direction at a constant speed during operation of the unit.

During the first stage of the weighing operation, that is to say, the estimation or pre-metering stage, a blocking screen 4, which will be used for reducing the rate of flow during the second stage (the "balance quantity" stage) is held in a raised position by an arm 5 to which it is fixed, so as not to interfere with the rate of flow of the product to be metered. The arm 5 is pivoted on a fixed shaft 6 and held in the required position by a jack 7, to which its end 51 opposite to that carrying the screen 4 is connected.

The screen 4 comprises a central opening 41 which, as will be seen in FIG. 4, allows only a reduced outlet to be offered for the passage of the product to be metered when the screen in quesiton is placed against the hub of the roller 1. In this manner, the rate of flow of the "balance quantity" is only a fraction of the rate of flow during the "estimated" step, as illustrated by FIGS. 3 and 4.

Associated with the screen 4 is a movable shutter 8 which is carried by an arm 9, which is also pivoted on the fixed shaft 6. This shutter is designed for masking to a greater or lesser extent the opening 41 in the screen 4. A stop screw 10, which co-operates with a stop 101 carried by the arm 5, permits the extreme position for the masking of the shutter 8 to be regulated (FIGS. 2 and 5). A spring 11 tends to apply the screw 10 to the stop 101. This spring is attached at one end to an extension 91 of the lever 9 and at the other end to the end 51 of the arm 5.

Also pivoted on the fixed shaft 6 is a lever 18, which ends in a roller 17 by which it is applied to a cam 15. A spring 19 ensures that the roller is applied to the cam and a stop screw 20 limits the angle to which the lever 18 and the extension 91 of the arm 9 can be brought closer to one another.

As can be seen in FIG. 7, the cam 15 is mounted on a shaft 14, which can be driven by an assembly comprising a motor, brake and variable reduction gear 13, by means of an electromagnetic clutch 12; in addition, it is subject to the return action of a torstion spring 16.

When the extractor roller 1 is set in operation, the electromagnetic clutch 12 is energised and it couples the cam to the motor unit 13. During its rotational movement, the cam displaces the lever 18 and hence the stop screw 20 approaches the extension 91 of the lever 9 carrying the auxiliary shutter 8.

When the mass of product collected in the load receiver 23 (FIG. 7) reaches the value P, a signal transmitted from a compact 24 of the weighing instrument stops the assembly 13, and this immobilises the cam 15 and acts in such a way that the jack 7 places the arm 5 in the low position shown in FIGS. 5 and 6, in which the screen 4 is brought into proximity with the hub of the extractor roller 1. The spring 11 causes the movement of the arm 9 to follow the arm 5 until the extension 91 encounters the stop screw 20, the position of which is determined by that of the cam 15 and is hence a function of the duration of the estimation stage.

The contour of the cam is determined as a fucntion of the correcting low which it is desired to obtain.

In the illustrated device, the value of the vector radius of the cam is proportional to the duration of the estimation stage.

FIG. 5 shows the position corresponding to the maximum of correction of the flow section offered by the screen 4. The screw 10 is applied to the stop 101 of the arm 5 and thus the auxiliary shutter 8 has a maximum masking effect on the opening 41 of the screen 4. This possibility is produced when the duration of the estimation stage has been exceptionally short and it is thus desired to reduce to a maximum extent the balance quantity flow.

FIG. 6 shows the position which corresponds to a minimum of correction of the flow section. The roller 17 is disposed at the apex of the cam and hence the shutter 8 no longer in practice masks the opening 41 of the screen 4. This position is chosen by regulating the angular speed of the cam 15 by means of the variable reduction gear, for the case of the distribution of a product with the lowest apparent density that is likely to be encountered.

Associated with the cam is a travel-limiting contact device 21, 22, which stops the said cam if, for example, because of an absence of product, the maximum period fixed for the estimation stage is exceeded.

The invention can be applied to the metering of all materials in the form of lumps, grains or powders, particularly hygroscopic materials such as detergents, powdered milk, and the like.

What is claimed is:

1. A method of regulating the operation of a weight-measuring unit which comprises delivering material to be weighed at a first constant rate of flow by volume in a predosage step until a predetermined major portion of the desired dosage has been delivered, and delivering the remaining minor portion of the desired dosage in a secon step at a second rate of flow by volume which is also constant during the said second step but less than the first constant rate, the second rate of flow by volume being modulated in proportion to the duration of the predosage step so as to maintain the rate of delivery by weight of the material during the second step at a value which is sustantially constant from one weighing operation to the next.

2. A method of weighing repeated dosages of granular or powdered material which comprises deliverying the material in a predosage step at a first substantially constant rate of flow by volume until a predetermined major portion of a dosage has been delivered, delivering the remaining minor portion of said dosage in a second step at a reduced rate of flow by volume which is constant during said second step but modulated from one operation to the other, the degree of modulation being controlled by the duration of the predosage step so that a predetermined rate of flow of material by weight is achieved during said second step, sand repeating the cycle for another dosage.

3. A weight-measuring unit for weighing repeated dosages of powdered or granulated material, comprising weight-sensing means, supply means for supplying material along a path to said weight sensing means, screen-means interposable in said path for reducing the rate of volume flow of material to said weight-sensing means, control means responsive to said weight-sensing means to cause interposition of said screen means in said path after a predetermined major portion of said dosage has been delivered to said weight-sensing means, and modulating means for modulating, in dependence on the time taken to deliver said predetermined major portion to said weight-sensing means, the degree of reduction of the rate of volume flow of said material to said weight-sensing means so as to maintain the rate of delivery by weight of the remaining minor portion of said dosage at a value which is substantially constant from the weighing of one dosage to the next.

4. A unit according to claim 3, in which said screen means has an opening formed therein and in which said modulating means includes movable shutter means adapted to mask said opening to a greater or lesser extent.

5. A metering device for metering repeated dosages of a granulated or powdered material to a weight-sensing device, said metering device comprising hopper means for the material, rotatable metering drum means adjacent the exit of said hopper means for feeding material from said hopper means to said weight-sensing device, movable screen means movably mounted for movement relative to the axis of said drum means between an operative position in which said screen means acts to cut off at least in part the flow of material from said hopper means to said weigth-sensing device and an inoperative position, screen actuating means responsive to a signal from said weight-sensing device when a predetermined major portion of a dosage has been delivered thereto to move said screen means from its inoperative position to its operative position, and modulating means for modulating in dependence on the time taken to deliver said predetermined major portion of to weight-sening device the degree of flow cut-off effected by said screen means in its operative position, whereby the rate of delivery by weight of the remaining minor portion of said dosage is maintained at a substantially constant value from one weighing operation to the next.

6. A metering device according to claim 5, in which said screen means has an opening therein for the passage of material and in which said modulating means includes movable shutter means adapted to mask said opening to a greater or lesser extent.

7. A metering device according to claim 6, in which said modulating means further includes a cam for controlling the position of said shutter means, which cam is arranged to commence rotation from a start position at the beginning of a weighing operation and to stop when said predetermined major portion has been delivered to said weight-sensing device, whereby the position of said cam when it stops determines the degree of masking of said opening by said shutter means.

8. A weight-measuring unit for measuring depeated dosages of powdered or granulated material comprising a weighing instrument, supply means for supplying material to the weighing instrument in a flowable stream, movable screen means movable from an inoperative position to an operative position in which said screen means cuts off partially said stream of flowable material, screen actuating means responsive to a signal from said weighing instrument when a predetermined major portion of a dosage has been delivered in a predosage step to said weighing instrument to move said screen means to said operative position, and modulating means for modulating, in dependence on the time taken to deliver said predetermined major portion to said weighing instrument, the degree of cut-off effected by said screen means in its operative position, whereby the rate of delivery by weight of the remaining minor portion of said dosage is maintained at a substantially constant rate from one weighing operation to another.

9. A weight-measuring unit according to claim 8, in which said screen means is provided with an opening therein for the passage of material therethrough and in which said modulating means includes movable shutter means adapted to mask said opening to a greater or lesser extent.

10. A weight-measuring unit according to claim 8, in which said supply means includes hopper means and extractor drum means mounted adjacent the exit of said hopper means, and in which said screen means is movable towards and away from the axis of said drum.

11. A weight-measuring unit according to claim 9, in which said modulating means further includes a cam which is arranged to commence rotation from a start position at the beginning of a weighing operation and to stop when said predetermined major portion has been delivered to said weighing instrument and which has a ramp the instantaneous effective height of which is proportional to the duration of said predosage step, whereby the position of said cam when it stops determines the degree of masking of said opening by said shutter means.

12. A weight-measuring unit according to claim 11, in which said screen means and said shutter means are carried by first and second arms respectively, said first and second arms being mounted for pivoting about a common axis and said second arm being resiliently coupled to said first arm, and in which said cam acts upon a third arm also mounted for pivoting about said common axis and carrying a stop member against which said second arm may abut, whereby upon actuation of said screen means said second arm rotates with said first arm until it abuts against said stop member, the position of said stop member thereby determining the position of said shutter means elative to said screen means.

13. A weight-measuring unit according to claim 11, in which said cam is connected to a motor-brake unit by means of a clutch which is controlled by said weighing instrument.

14. A weight-measuring unit according to claim 12, in which adjustable stops are provided for regulating the latitude of displacement of said first and second arms.

* * * * *